(12) United States Patent
Tsuji et al.

(10) Patent No.: US 9,882,181 B2
(45) Date of Patent: Jan. 30, 2018

(54) COATED CELL AND MODULE BATTERY

(71) Applicant: NGK Insulators, Ltd., Nagoya-Shi (JP)

(72) Inventors: Yuki Tsuji, Ichinomiya (JP); Masahiro Murasato, Chita (JP); Yasuhiro Horiba, Ichinomiya (JP); Ichiro Okazaki, Nagoya (JP); Takuya Ishihara, Tsushima (JP); Miho Kasahara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 219 days.

(21) Appl. No.: 14/665,353

(22) Filed: Mar. 23, 2015

(65) Prior Publication Data

US 2015/0194641 A1 Jul. 9, 2015

Related U.S. Application Data

(63) Continuation of application No. PCT/JP2013/076692, filed on Oct. 1, 2013.

(30) Foreign Application Priority Data

Oct. 2, 2012 (JP) ................. 2012-220199

(51) Int. Cl.
 *H01M 2/02* (2006.01)
 *H01M 2/10* (2006.01)
 *H01M 10/39* (2006.01)

(52) U.S. Cl.
 CPC .......... *H01M 2/029* (2013.01); *H01M 2/022* (2013.01); *H01M 2/0277* (2013.01); *H01M 2/1016* (2013.01); *H01M 10/3909* (2013.01); *H01M 2/105* (2013.01); *H01M 2/1077* (2013.01)

(58) Field of Classification Search
 None
 See application file for complete search history.

(56) References Cited

FOREIGN PATENT DOCUMENTS

| JP | 03-283272 A1 | 12/1991 |
|----|---|---|
| JP | 07-245123 A1 | 9/1995 |
| JP | 08-339823 A1 | 12/1996 |
| JP | 10-284119 A1 | 10/1998 |
| JP | 11-086812 A | 3/1999 |
| JP | 11-329487 A1 | 11/1999 |
| JP | 2004-265743 A1 | 9/2004 |
| JP | 3177968 U | 8/2012 |

OTHER PUBLICATIONS

International Search Report and Written Opinion (Application No. PCT/JP2013/076692) dated Dec. 17, 2013 (in English).
European Search Report, European Application No. 13 84 3461, dated Mar. 8, 2016 (6 pages).

*Primary Examiner* — Helen O Conley

(74) *Attorney, Agent, or Firm* — Burr & Brown, PLLC

(57) ABSTRACT

An outer peripheral surface of a cylindrical cell is coated with a heat insulation material. A heat-resistant material is stacked radially outside the heat insulation material. An electrical insulation material is stacked radially outside the heat-resistant material. The order in which the heat insulation material, the heat-resistant material and the electrical insulation material are stacked one on top of another may be changed. A coating material other than the heat insulation material, the heat-resistant material and the electrical insulation material may be provided.

12 Claims, 14 Drawing Sheets

COATED CELL AND MODULE BATTERY

BACKGROUND OF THE INVENTION

1. Field of the Invention

The present invention relates to a coated cell and a module battery.

2. Description of Related Art

In a module battery, cylindrical cells of sodium sulfur batteries are housed within a case, as shown in FIG. 4 of Patent Literature 1. The cylindrical cells are erected vertically, and are arranged in a closest packed manner in a horizontal direction.

PRIOR ART LITERATURES

Patent Literature

Patent Literature 1: Japanese Patent Application Laid-Open No. 7-245123 (1995)

SUMMARY OF THE INVENTION

Problems to be Solved by the Invention

When the cylindrical cells are arranged, there are cases where a chain reaction of burning of cylindrical cells occurs, so that the burning of one cylindrical cell causes the burning of another cylindrical cell adjacent thereto.

In particular, when the cylindrical cells are arranged in a closest packed manner in a horizontal direction, a distance from one cylindrical cell to another cylindrical cell adjacent thereto is short. Thus, a chain reaction of burning of cylindrical cells is prone to occur, so that the burning of one cylindrical cell is prone to cause the burning of another cylindrical cell.

The present invention has been made to solve this problem. It is an object of the present invention to prevent a chain reaction of burning of cylindrical cells to improve the safety of a module battery.

Means for Solving the Problems

A coated cell includes a cylindrical cell, a first coating material, a second coating material and a third coating material. The cylindrical cell is a sodium sulfur battery. The first coating material coats an outer peripheral surface of the cylindrical cell. The second coating material is stacked radially outside the first coating material.

The third coating material is stacked radially outside the second coating material. Each of the first coating material, the second coating material and the third coating material is a heat insulation material, a heat-resistant material or an electrical insulation material. The first coating material, the second coating material and the third coating material include all of the heat insulation material, the heat-resistant material and the electrical insulation material.

Preferably, the first coating material is the heat insulation material, the second coating material is the heat-resistant material, and the third coating material is the electrical insulation material.

Preferably, the heat insulation material is made of mica.

Preferably, the heat-resistant material is a carbon sheet laminate comprised of not less than two carbon sheets stacked one on top of another.

Preferably, the heat insulation material is a mica sheet. The mica sheet is flexible. The mica sheet has a thickness in the range of 0.6 mm to 1.8 mm, and more preferably has a thickness in the range of 1.0 mm to 1.4 mm.

Preferably, the cylindrical cell includes a positive electrode container, a solid electrolyte tube, an electric conduction assistant material, a positive electrode active material and a negative electrode active material. The solid electrolyte tube is housed in the positive electrode container. The electric conduction assistant material and the positive electrode active material are housed in a gap between the positive electrode container and the solid electrolyte tube. The positive electrode active material is impregnated into the electric conduction assistant material. The neuative electrode active material is isolated from the positive electrode active material by the solid electrolyte tube. The heat-resistant material coats at least an area above an upper end of said electric conduction assistant material. More preferably, the electric conduction assistant material is graphite felt.

Preferably, the heat-resistant material is a carbon sheet laminate comprised of not less than two carbon sheets stacked one on top of another. Each of the not less than two carbon sheets has a thickness in the range of 0.10 mm to 0.50 mm, and more preferably has a thickness in the range of 0.20 mm to 0.40 mm.

Preferably, an upper end of one of the heat insulation material and the electrical insulation material which is radially outside the heat-resistant material is above an upper end of the heat-resistant material. More preferably, an upper end of one of the heat insulation material and the electrical insulation material which is radially inside the heat-resistant material is above the upper end of the heat-resistant material.

Preferably, the aforementioned electrical insulation material is a first electrical insulation material, and the coated cell further comprises a second electrical insulation material. The second electrical insulation material coats a bottom surface of the cylindrical cell. The third coating material includes an outer peripheral surface-facing portion, a bent portion and a bottom surface-facing portion. The outer peripheral surface-facing portion is opposed to the outer peripheral surface, with the first coating material and the second coating material therebetween. The bottom surface-facing portion is opposed to the bottom surface, with the second electrical insulation material therebetween, and supports the first coating material, the second coating material and the second electrical insulation material. The bottom surface-facing portion is contiguous to the outer peripheral surface-facing portion via the bent portion.

Preferably, a module battery includes: a case and not less than two coated cells. The case has a housing space formed therein. The not less than two coated cells are housed in the housing space. Each of the not less than two coated cells is the aforementioned coated cell.

Preferably, the not less than two coated cells are erected vertically and squarely arranged in a horizontal direction.

Advantageous Effects of the Invention

According to the present invention, a chain reaction of burning of the cylindrical cells is prevented, so that the safety of the module battery is improved.

These and other objects, features, aspects and advantages of the present invention will become more apparent from the following detailed description of the present invention when taken in conjunction with the accompanying drawings.

DETAILED DESCRIPTION OF THE INVENTION

First Embodiment (Overview)

A first embodiment relates to a module battery for a sodium sulfur battery.

Figure 1:
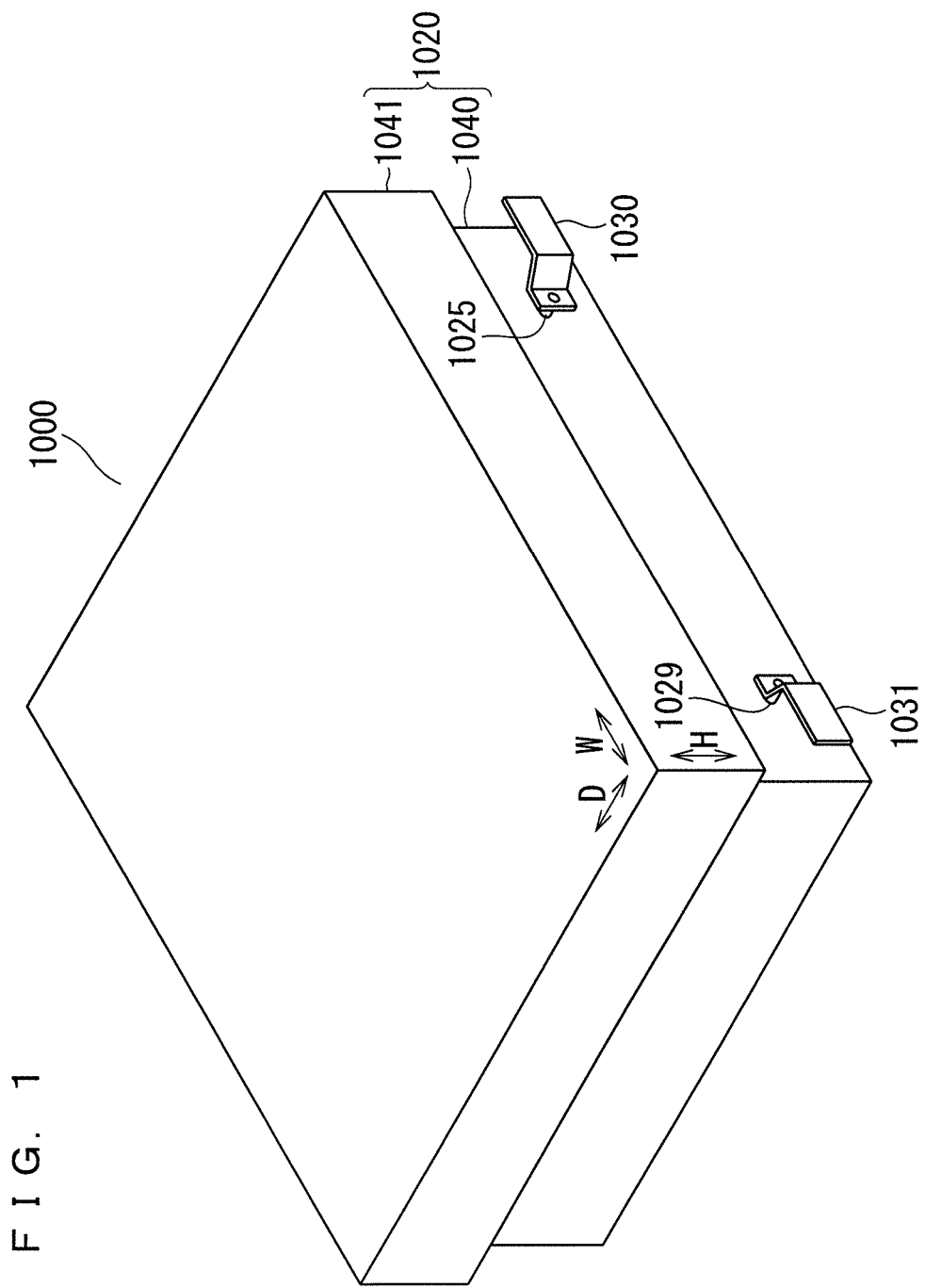
FIG. 1 is a perspective view of a module battery according to a first embodiment.
Figure 2:
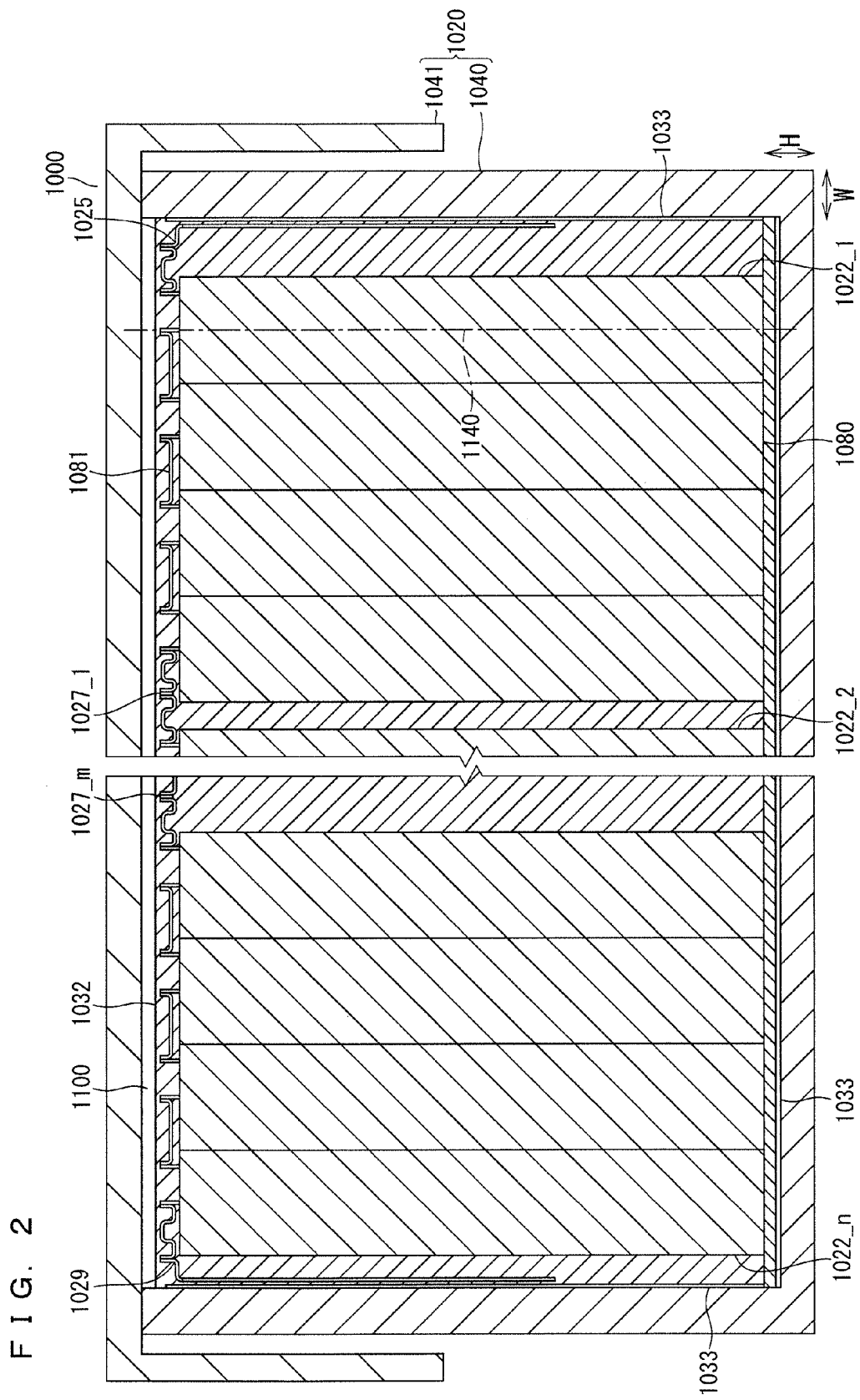
FIG. 2 is a vertical sectional view of the module battery according to the first embodiment.
Figure 3:
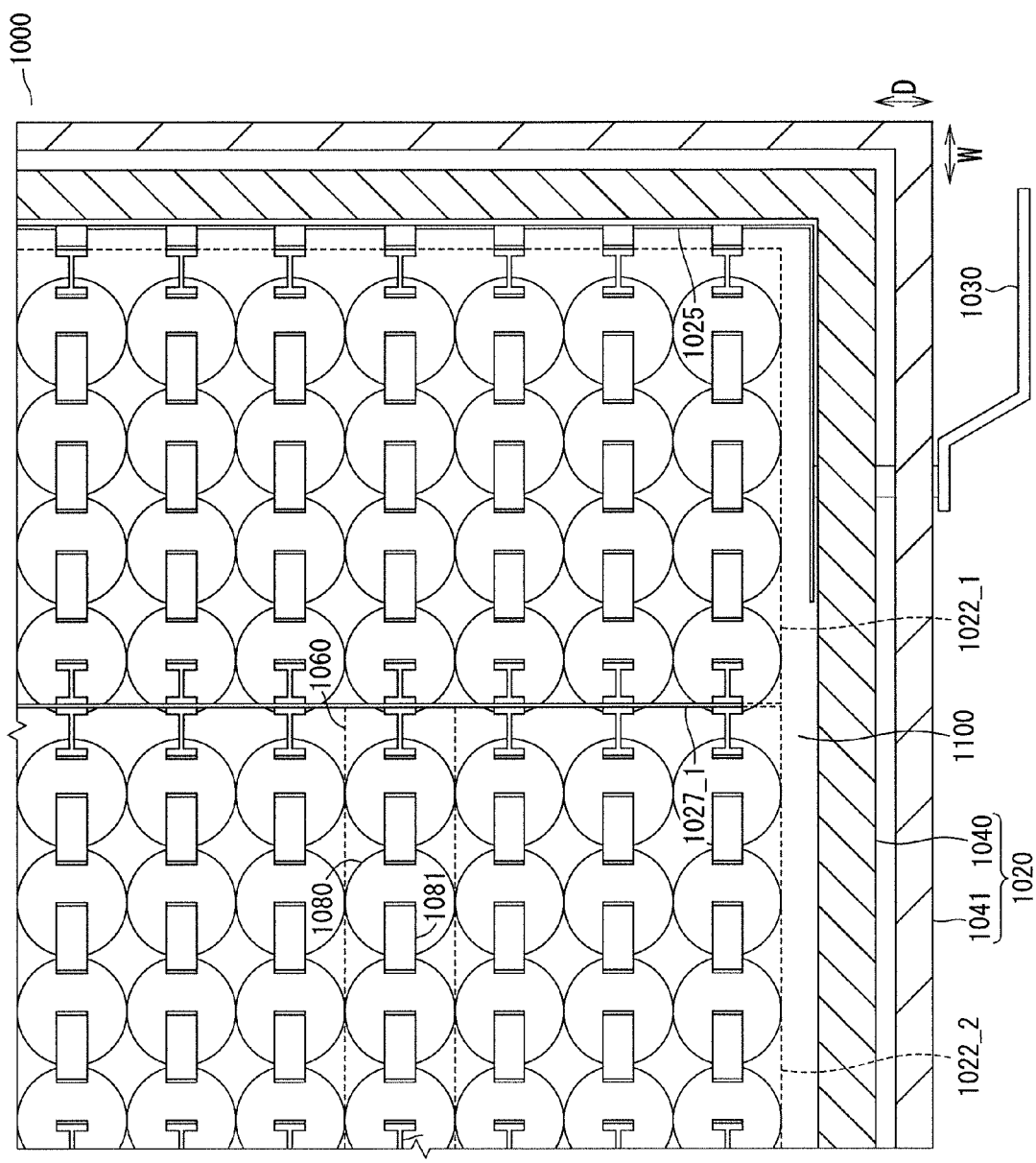
FIG. 3 is a horizontal sectional view of the module battery according to the first embodiment.
Figure 4:
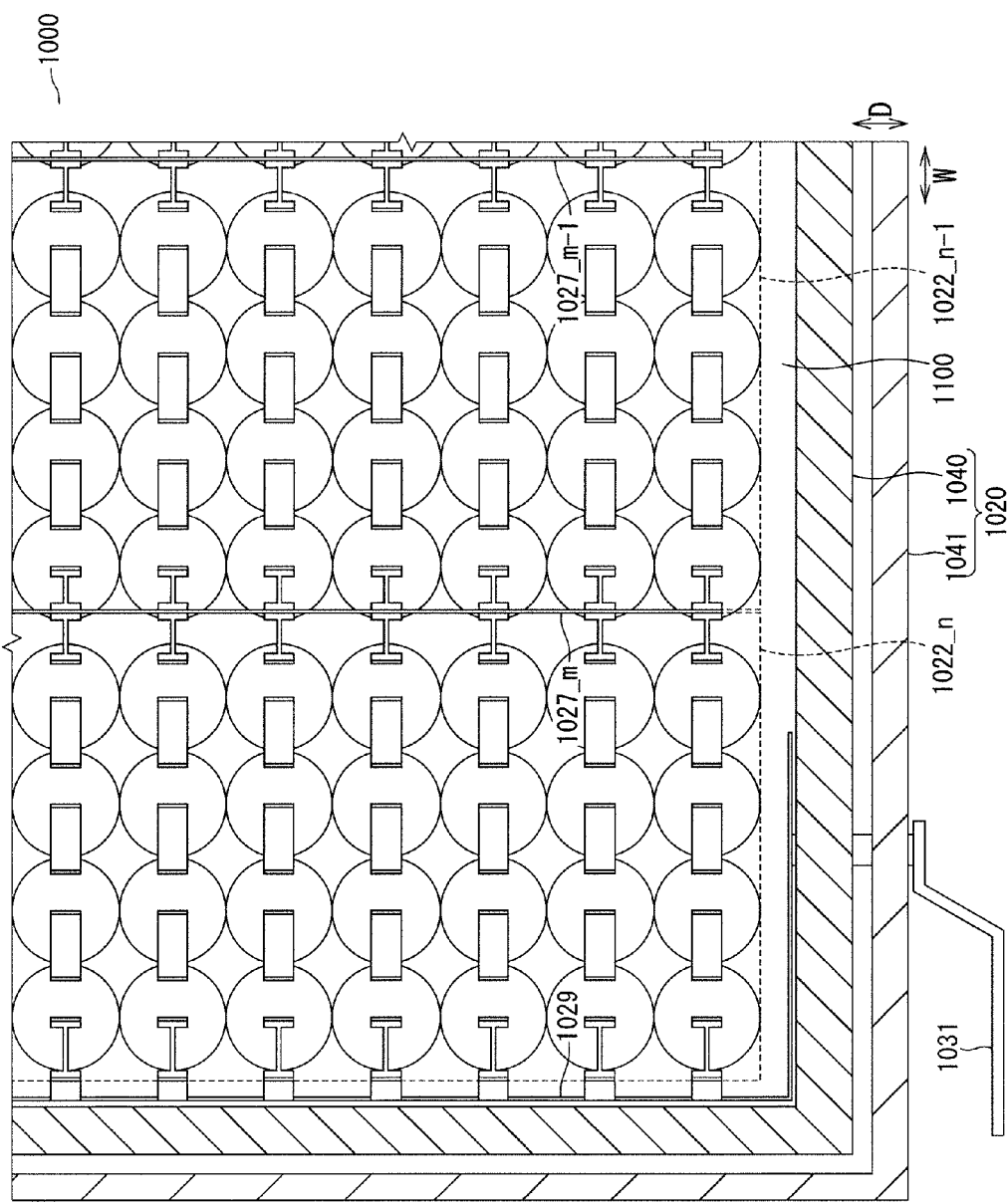
FIG. 4 is a horizontal sectional view of the module battery according to the first embodiment.
Figure 5:
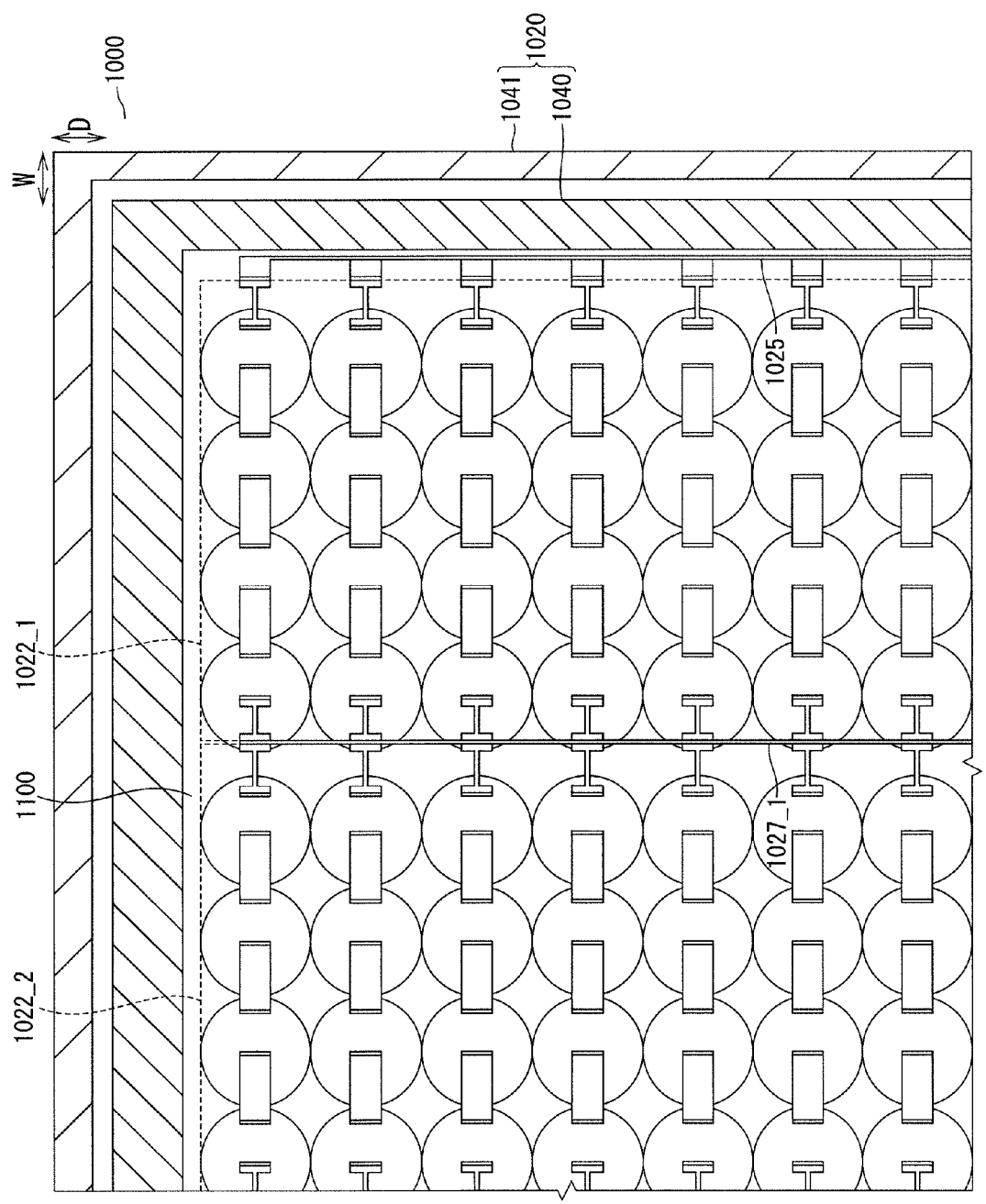
FIG. 5 is a horizontal sectional view of the module battery according to the first embodiment.
Figure 6:
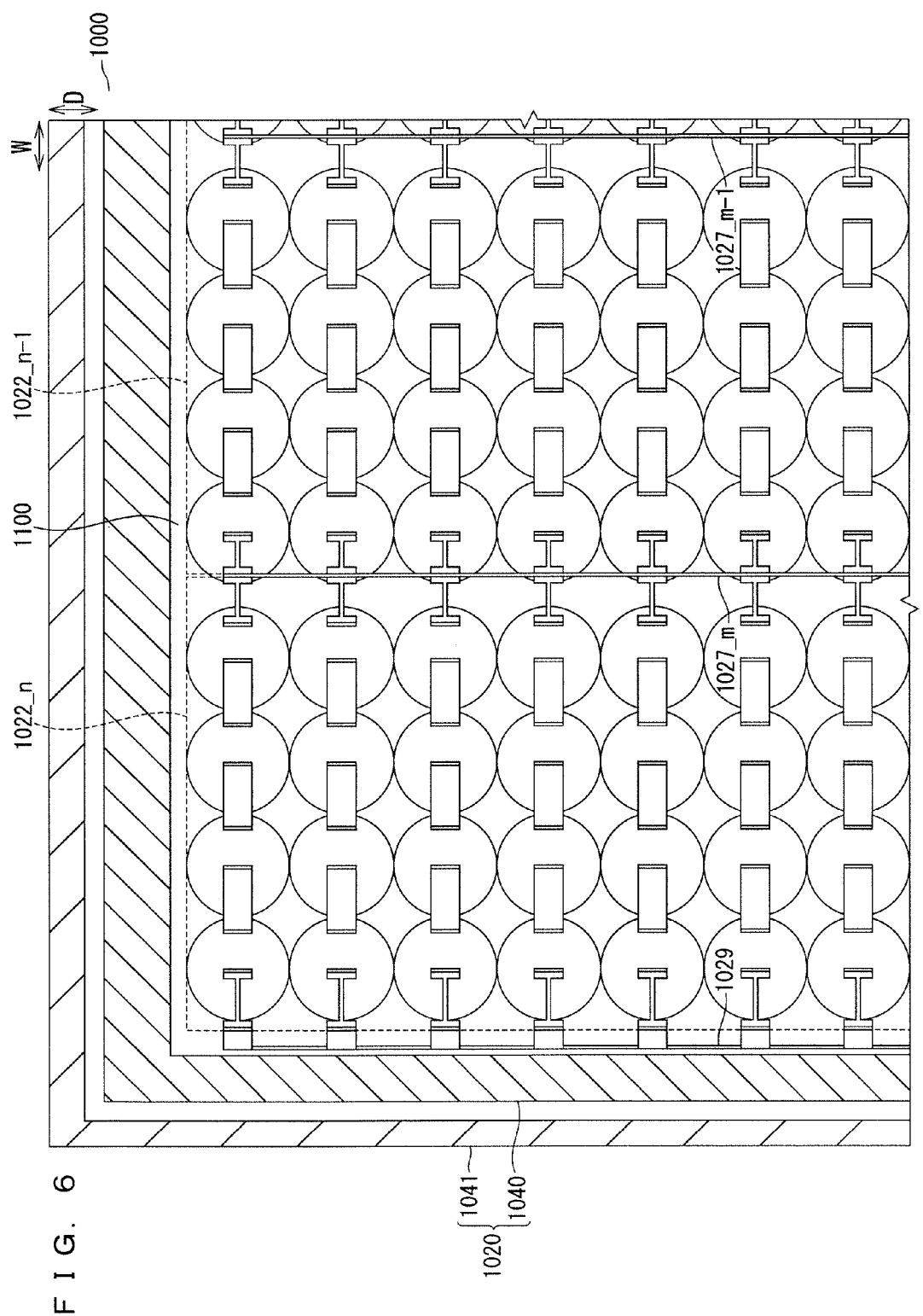
FIG. 6 is a horizontal sectional view of the module battery according to the first embodiment.

A schematic view of FIG. 1 is a perspective view of the module battery according to the first embodiment. A schematic view of FIG. 2 is a vertical sectional view of the module battery. Schematic views of FIGS. 3 to 6 are horizontal sectional views of the module battery. FIGS. 3 to 6 show the module battery from which sand and a heater to be described later are removed. FIGS. 3 to 6 show the right-hand near side, the left-hand near side, the right-hand far side and the left-hand far side, respectively, of the module battery.

As shown in FIGS. 1 to 6, a module battery 1000 includes: a case 1020; n string groups 1022_1, 1022_2, . . . , 1022_n; a positive electrode bus 1025; m parallel buses 1027_1, 1027_2, . . . , 1027_m; a negative electrode bus 1029; a positive electrode bus bar 1030; a negative electrode bus bar 1031; sand 1032; and a heater 1033.

The number n of string groups provided in the module battery 1000 is not less than two. The number n of string groups provided in the module battery 1000 may be one. The number m of parallel buses provided in the module battery 1000 is increased or decreased in accordance with the number n of string groups provided in the module battery 1000.

The case 1020 includes a vacuum heat insulation container 1040 and an atmospheric heat insulation lid 1041. The heat insulation performance of the case 1020 is changed in accordance with the specifications of the module battery 1000. Thus, the vacuum heat insulation container 1040 may be replaced with a heat insulation container other than the vacuum heat insulation container or with a container other than the heat insulation container. The atmospheric heat insulation lid 1041 may be replaced with a heat insulation lid other than the atmospheric heat insulation lid or with a lid other than the heat insulation lid. The shape of the case 1020 may be changed.

Each of the n string groups 1022_1, 1022_2, . . . , 1022_n includes p strings 1060. The number p of strings provided in each of the n string groups 1022_1, 1022_2, . . . , 1022_n is not less than two.

Each of the n×p strings 1060 includes four coated cells 1080 and interconnect lines 1081. The number of coated cells 1080 provided in each of the n×p strings 1060 may be increased or decreased. In general, each of the n×p strings 1060 includes not less than two coated cells 1080.

A housing space 1100 is formed inside the case 1020. The n string groups 1022_1, 1022_2, . . . , 1022_n, the m parallel buses 1027_1, 1027_2, . . . , 1027_m, the sand 1032 and the heater 1033 are housed in the housing space 1100. The positive electrode bus bar 1030 and the negative electrode bus bar 1031 are outside the case 1020. The positive electrode bus 1025 and the negative electrode bus 1029 extend from the housing space 1100 to the outside of the case 1020. The positive electrode bus 1025 is coupled to the positive electrode bus bar 1030 outside the case 1020, and is electrically connected to the positive electrode bus bar 1030. The negative electrode bus 1029 is coupled to the negative electrode bus bar 1031 outside the case 1020, and is electrically connected to the negative electrode bus bar 1031.

A component in addition to these components may be added to the module battery 1000. There are cases in which some of these components are omitted from the module battery 1000.

Figure 7:
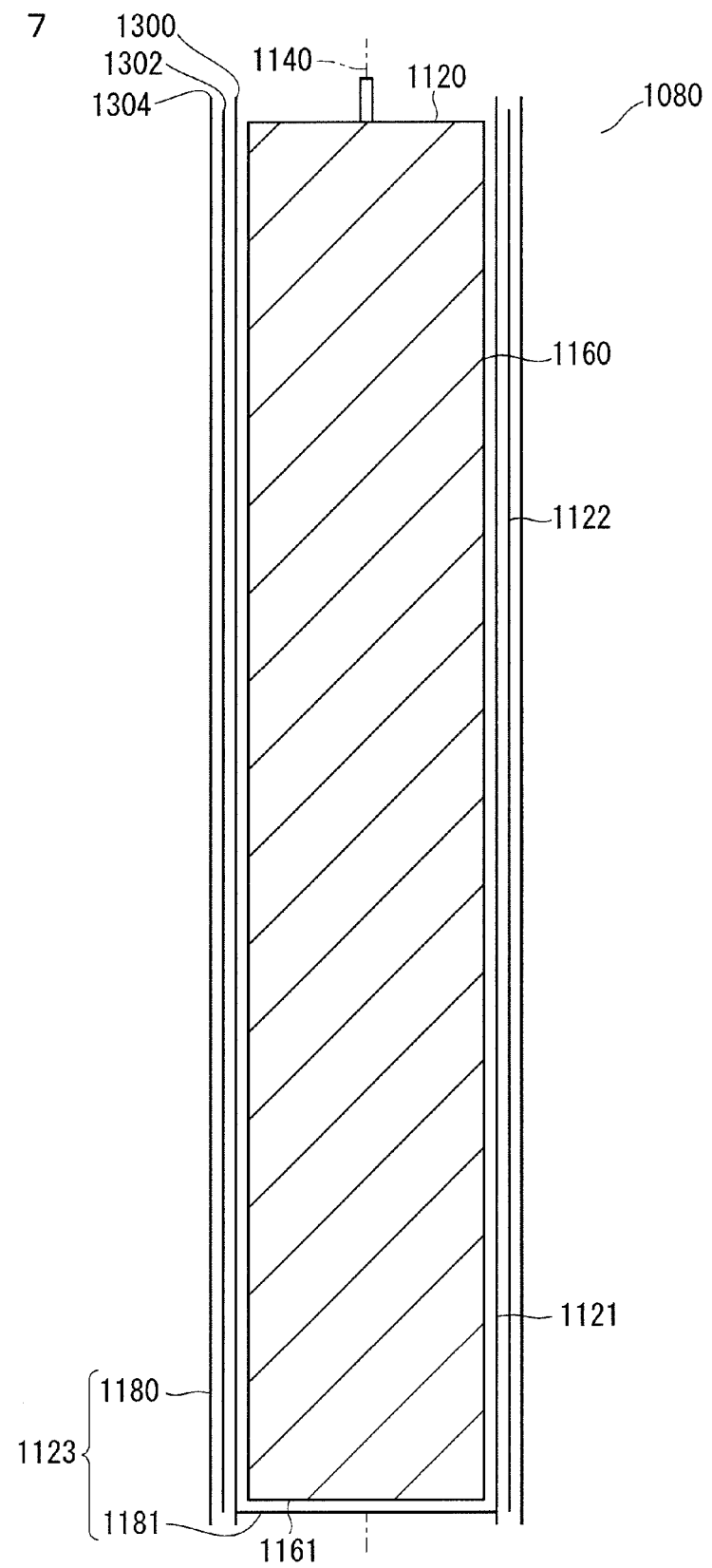
FIG. 7 is a vertical sectional view of a coated cell according to the first embodiment.

A schematic view of FIG. 7 is a vertical sectional view of a coated cell. A schematic view of FIG. 8 is a sectional view of a coating structure.

Figure 8:
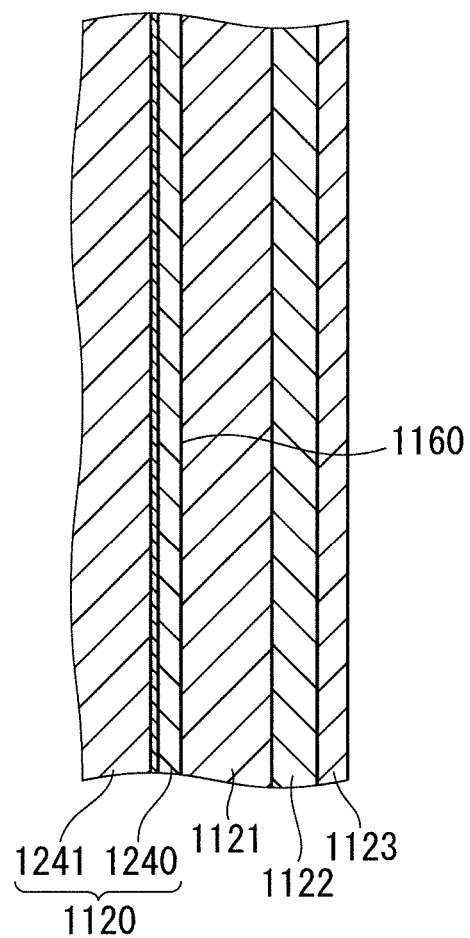
FIG. 8 is a sectional view of a coating structure according to the first embodiment.

As shown in FIGS. 7 and 8, each of the 4×n×p coated cells 1080 includes a cylindrical cell 1120, a heat insulation material 1121, a heat-resistant material 1122, and an electrical insulation material 1123.

A component in addition to these components may be added to the coated cell 1080.

The cylindrical cells 1120 are sodium sulfur batteries. When the module battery 1000 is charged and discharged, the heater 1033 adjusts the temperature of the housing space 1100 to a temperature at which the sodium sulfur batteries operate. For example, the temperature of the housing space 1100 is adjusted to approximately 300° C.

For the charging of the module battery 1000, a charging current is supplied from the outside through the positive electrode bus bar 1030 and the negative electrode bus bar 1031 to the module battery 1000, so that the cylindrical cells 1120 are charged. For the discharging of the module battery 1000, the cylindrical cells 1120 are discharged, so that a discharge current is supplied from the module battery 1000 through the positive electrode bus bar 1030 and the negative electrode bus bar 1031 to the outside.

(Arrangement of Cells)

As shown in FIGS. 2 to 6, the n string groups 1022_1, 1022_2, . . . , 1022_n are arranged in a width direction W of the module battery 1000. In general, the n string groups 1022_1, 1022_2, . . . , 1022_n are arranged in a first direction.

In each of the n string groups 1022_1, 1022_2, . . . , 1022_n, the p strings 1060 are arranged in a depth direction D of the module battery 1000. In general, the p strings 1060 are arranged in a second direction. The second direction is perpendicular to the first direction.

In each of the n×p strings 1060, the four coated cells 1080 are arranged in the width direction W of the module battery 1000. In general, the four coated cells 1080 are arranged in the first direction.

A height direction H of the module battery 1000 is a vertical direction. The width direction W and the depth direction D of the module battery 1000 are horizontal directions.

Each of the 4×n×p coated cells 1080 is erected vertically. The 4×p coated cells 1080 in each of the n string groups 1022_1, 1022_2, ..., 1022_n are squarely arranged in a horizontal direction.

When each of the coated cells 1080 is erected vertically and the coated cells 1080 are squarely arranged in a horizontal direction, the cylindrical axes 1140 of the respective cylindrical cells 1120 extend in the height direction H of the module battery 1000, and the cylindrical axes 1140 are arranged at lattice points of a square lattice as viewed in a direction parallel to the cylindrical axes 1140.

Figure 9:
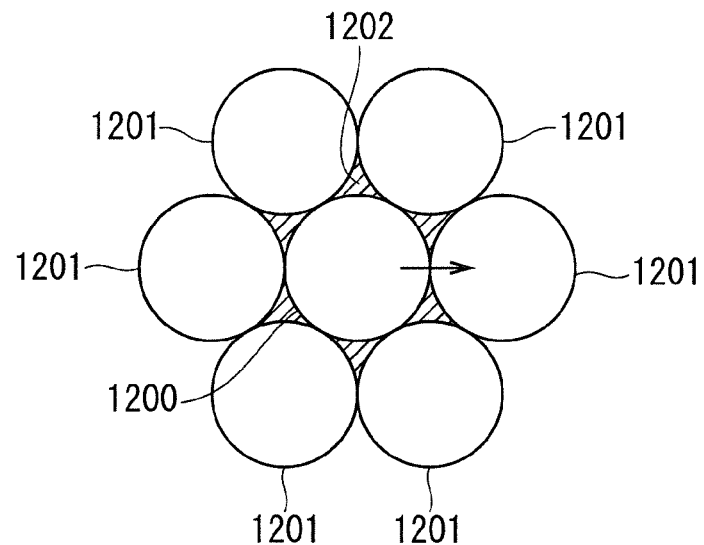
FIG. 9 is a plan view of coated cells arranged in a closest packed manner according to the first embodiment.
Figure 10:
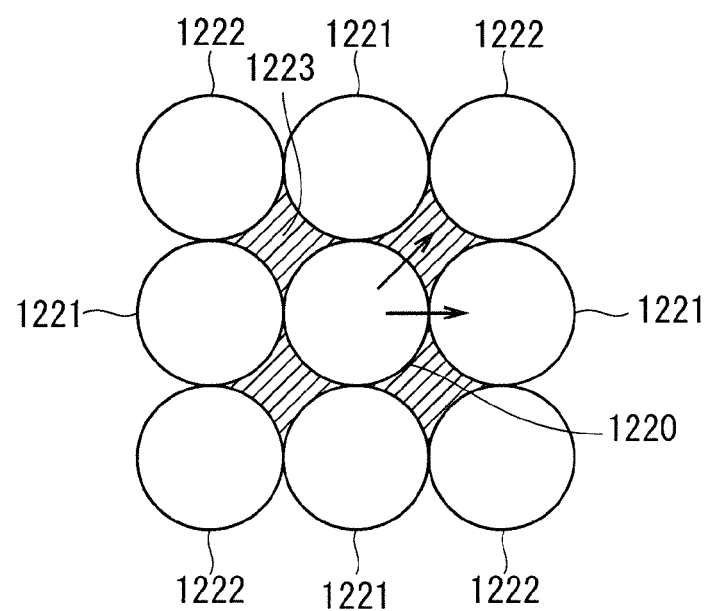
FIG. 10 is a plan view of squarely arranged coated cells according to the first embodiment.

A schematic view of FIG. 9 is a plan view of coated cells arranged in a closest packed manner. FIG. 10 is a plan view of squarely arranged coated cells.

As shown in FIG. 9, when the coated cells 1080 are arranged most densely, a distance from a burned coated cell 1200 to six coated cells 1201 adjacent to the burned coated cell 1200 is short, and the heat capacity of sand 1202 around the burned coated cell 1200 is low. Accordingly, a chain reaction of burning is prone to occur.

On the other hand, when the coated cells 1080 are squarely arranged as shown in FIG. 10, a distance from a burned coated cell 1220 to four coated cells 1222 adjacent to the burned coated cell 1220 is long, and the heat capacity of sand 1223 around the burned coated cell 1220 is high although a distance from the burned coated cell 1220 to four coated cells 1221 adjacent to the burned coated cell 1220 is short. Accordingly, a chain reaction of burning is not prone to occur. When a chain reaction of burning is not prone to occur, the safety of the module battery 1000 is improved.

(Coating)

As shown in FIGS. 7 and 8, the heat insulation material 1121, the heat-resistant material 1122 and the electrical insulation material 1123 are stacked one on top of another in the order named from inside to outside in a radial direction. The radial direction refers to a direction which is perpendicular to the cylindrical axes 1140 and which is toward or away from the cylindrical axes 1140.

The electrical insulation material 1123 is provided in the radially outermost position to ensure electrical insulation between one cylindrical cell 1120 and other cylindrical cells 1120. The heat-resistant material 1122 is provided in the radially outermost position except the electrical insulation material 1123 to block flames or melts at a place as far as possible from the cylindrical cell 1120. The heat-resistant material 1122 is resistant to damage due to melting, so that a through hole is less liable to be formed in the heat-resistant material 1122. However, the heat-resistant material 1122 does not have a heat insulation function. For this reason, the heat insulation material 1121 is provided radially inside the heat-resistant material 1122. This arrangement suppresses a chain reaction of burning with the use of a small number of coating layers. As long as the coating includes all of the heat insulation material 1121, the heat-resistant material 1122 and the electrical insulation material 1123, the order of stacking of the heat insulation material 1121, the heat-resistant material 1122 and the electrical insulation material 1123 may be changed, and another coating material in addition to the heat insulation material 1121, the heat-resistant material 1122 and the electrical insulation material 1123 may be provided. For example, the heat insulation material 1121 may be stacked radially outside the heat-resistant material 1122, and the electrical insulation material 1123 may be stacked radially outside the heat insulation material 1121. A heat insulation material other than the heat insulation material 1121 may be provided between the heat-resistant material 1122 and the electrical insulation material 1123.

The heat insulation material 1121 is in plate-like form, and coats an outer peripheral surface 1160 of the cylindrical cell 1120. When one cylindrical cell 1120 is burned, the heat insulation material 1121 for another cylindrical cell 1120 adjacent to the one cylindrical cell 1120 insulates the adjacent cylindrical cell 1120 against heat from the one cylindrical cell 1120. This suppresses the increase in temperature of the interior of the adjacent cylindrical cell 1120. The heat insulation material 1121 is preferably made of mica. However, the heat insulation material 1121 may be made of a material other than mica. For example, the heat insulation material 1121 may be made of a ceramics fiber blanket. When the heat insulation material 1121 is made of mica, the thickness of the heat insulation material 1121 is 1.2 mm, for example. The thickness of the heat insulation material 1121 may be changed. For the purpose of insuring the thickness of the heat insulation material 1121, the cylindrical cell 1120 may be inserted into a cylindrical hole formed in a cylindrical bulk body made of mica, or a mica sheet which is flexible enough to be wound around the outer peripheral surface 1160 of the cylindrical cell 1120 may be wound around the outer peripheral surface 1160 of the cylindrical cell 1120.

When a flexible mica sheet is wound around the outer peripheral surface 1160 of the cylindrical cell 1120, improvements are made in dimensional accuracy of a finished product of the coated cell 1080, in the yield during the assembly of the coated cell 1080 and in transport density of the heat insulation material 1121, and the manufacturing costs of the heat insulation material 1121 are decreased.

When a flexible mica sheet is wound around the outer peripheral surface 1160 of the cylindrical cell 1120, the thickness of the mica sheet is preferably in the range of 0.6 mm to 1.8 mm, and more preferably in the range of 1.0 mm to 1.4 mm. When the thickness is greater than these ranges, the diameter of the coated cell 1080 becomes large and the case 1020 becomes accordingly large, so that the energy density of the module battery 1000 is prone to decrease. When the thickness is greater than these ranges, the mica sheet is wrinkled during the winding of the mica sheet, so that the coated cell 1080 is prone to have an uneven diameter. When the thickness is greater than these ranges, material costs are prone to rise. When the thickness is less than these ranges, heat insulating properties decrease, so that adjacent coated cells 1080 are prone to be damaged due to melting.

The mica which forms the heat insulation material 1121 may be either hard mica or soft mica. The heat insulating properties of the hard mica and the soft mica are substantially the same. The chemical formula of the hard mica is expressed as: $KAl_2(Si_3Al)O_{10}(OH)_2$. The melting point of the hard mica is 1250° C. The chemical formula of the soft mica is expressed as: $KMg_3(Si_3Al)O_{10}(OH)_2$. The melting point of the soft mica is 1350° C.

The mica which forms the heat insulation material 1121 is preferably soft mica. When the mica which forms the heat insulation material 1121 is soft mica, the heat insulation material 1121 is less prone to melt because of its high melting point. When the mica which forms the heat insulation material 1121 is soft mica, mica flakes are less prone to come off during the winding of the mica sheet because of its low hardness.

The heat-resistant material 1122 is stacked radially outside the heat insulation material 1121. The heat-resistant material 1122 mainly has a fire-resistant function. The heat-resistant material 1122 prevents flames or melts from diffusing radially outwardly from a burned cylindrical cell 1120. Also, when one cylindrical cell 1120 is burned, the heat-resistant material 1122 for another cylindrical cell 1120 adjacent to the one cylindrical cell 1120 blocks flames or melts from the one cylindrical cell 1120.

The heat-resistant material 1122 does not melt but maintains its shape at a high temperature. Preferably, the heat-resistant material 1122 maintains its shape at 2000° C. Preferably, the heat-resistant material 1122 is made of carbon. The heat-resistant material 1122 is allowed to be made of a material other than carbon. For example, the heat-resistant material 1122 is allowed to be made of ceramics.

When the heat-resistant material 1122 made of carbon is stacked radially outside the heat insulation material 1121, the cylindrical cell 1120 with the heat insulation material 1121 attached thereto may be inserted into a cylindrical hole formed in a cylindrical bulk body made of carbon, or a flexible carbon sheet may be wound around an outer peripheral surface of the cylindrical cell 1120 with the heat insulation material 1121 attached thereto.

The density of carbon which forms the cylindrical bulk body is preferably in the range of 0.7 g/cm$^3$ to 2.0 g/cm$^3$. The density of carbon which forms the carbon sheet is preferably in the range of 0.7 g/cm$^3$ to 1.5 g/cm$^3$.

Preferably, the heat-resistant material 1122 is a carbon sheet laminate comprised of not less than two carbon sheets stacked one on top of another. A carbon sheet is a material which is prone to be damaged. However, when not less than two carbon sheets are stacked one on top of another, the fire-resistant function of the heat-resistant material 1122 is not impaired in the presence of initial defects in the carbon sheets.

The sheet thickness of each of the not less than two carbon sheets which form the heat-resistant material 1122 is preferably in the range of 0.10 mm to 0.50 mm, and more preferably in the range of 0.20 mm to 0.40 mm. When the thickness is greater than these ranges, the diameter of the coated cell 1080 becomes large and the case 1020 becomes accordingly large, so that the energy density of the module battery 1000 is prone to decrease. When the thickness is greater than these ranges, the carbon sheet is wrinkled during the winding of the carbon sheet, so that the coated cell 1080 is prone to have an uneven diameter. Thus, a quality problem is prone to occur. When the thickness is less than these ranges, the heat-resisting properties decrease, so that adjacent coated cells 1080 are prone to be damaged due to melting. When the thickness is less than these ranges, the heat-resistant material 1122 is prone to be damaged. An example of the sheet thickness of each of the not less than two carbon sheets which form the heat-resistant material 1122 is 0.3 mm. The sheet thickness of the carbon sheets may be changed.

When the heat insulation material 1121 and the heat-resistant material 1122 are provided, the heat-resistant material 1122 inhibits the travel of flames and the heat insulation material 1121 provides insulation against heat from flames if a cylindrical cell 1120 is burned. This prevents a chain reaction of burning from the burned cylindrical cell 1120 to another cylindrical cell 1120 adjacent to the burned cylindrical cell 1120. The prevention of the chain reaction of burning improves the safety of the module battery 1000.

The electrical insulation material 1123 is in plate-like form. The electrical insulation material 1123 has a first portion 1180 stacked radially outside the heat-resistant material 1122 to further coat the heat-resistant material 1122. The electrical insulation material 1123 mainly has an electrical insulation function. The first portion 1180 of the electrical insulation material 1123 has a thickness of 0.4 mm, for example. The thickness of the first portion 1180 of the electrical insulation material 1123 may be changed. The electrical insulation material 1123 has a second portion 1181 which coats a bottom surface 1161 of the cylindrical cell 1120. The electrical insulation material 1123 is preferably made of mica. However, the electrical insulation material 1123 may be made of a material other than mica.

The heat insulation material 1121 and the heat-resistant material 1122 are radially outside the outer peripheral surface 1160 of the cylindrical cell 1120, and do not coat the bottom surface 1161 of the cylindrical cell 1120. This is because the bottom surface 1161 of the cylindrical cell 1120 is not opposed to adjacent cylindrical cells 1120, so that the necessity for heat insulation and resistance to fire is relatively small. However, the heat insulation material 1121 and the heat-resistant material 1122 may coat the bottom surface 1161 of the cylindrical cell 1120.

(Positions of Upper Ends of Heat Insulation Material, Heat-Resistant Material and Electrical Insulation Material)

An upper end 1300 of the heat insulation material 1121 and an upper end 1304 of the electrical insulation material 1123 are above an upper end 1302 of the heat-resistant material 1122. The term "above" refers to a direction parallel to the cylindrical axis 1140 and away from the bottom surface 1161 of the cylindrical cell 1120. Thus, the heat insulation material 1121 and the electrical insulation material 1123 suppress the falling off of burrs from the upper end 1302 of the heat-resistant material 1122. In general cases including a case where the order in which the heat insulation material 1121, the heat-resistant material 1122 and the electrical insulation material 1123 are stacked one on top of another is changed, the upper end of a coating material selected from the group consisting of the heat insulation material 1121 and the electrical insulation material 1123 and stacked radially outside the heat-resistant material 1122 is above the upper end 1302 of the heat-resistant material 1122, and preferably the upper end of a coating material selected from the group consisting of the heat insulation material 1121 and the electrical insulation material 1123 and stacked radially inside the heat-resistant material 1122 is above the upper end 1302 of the heat-resistant material 1122.

(Connection of Cells)

Figure 11:
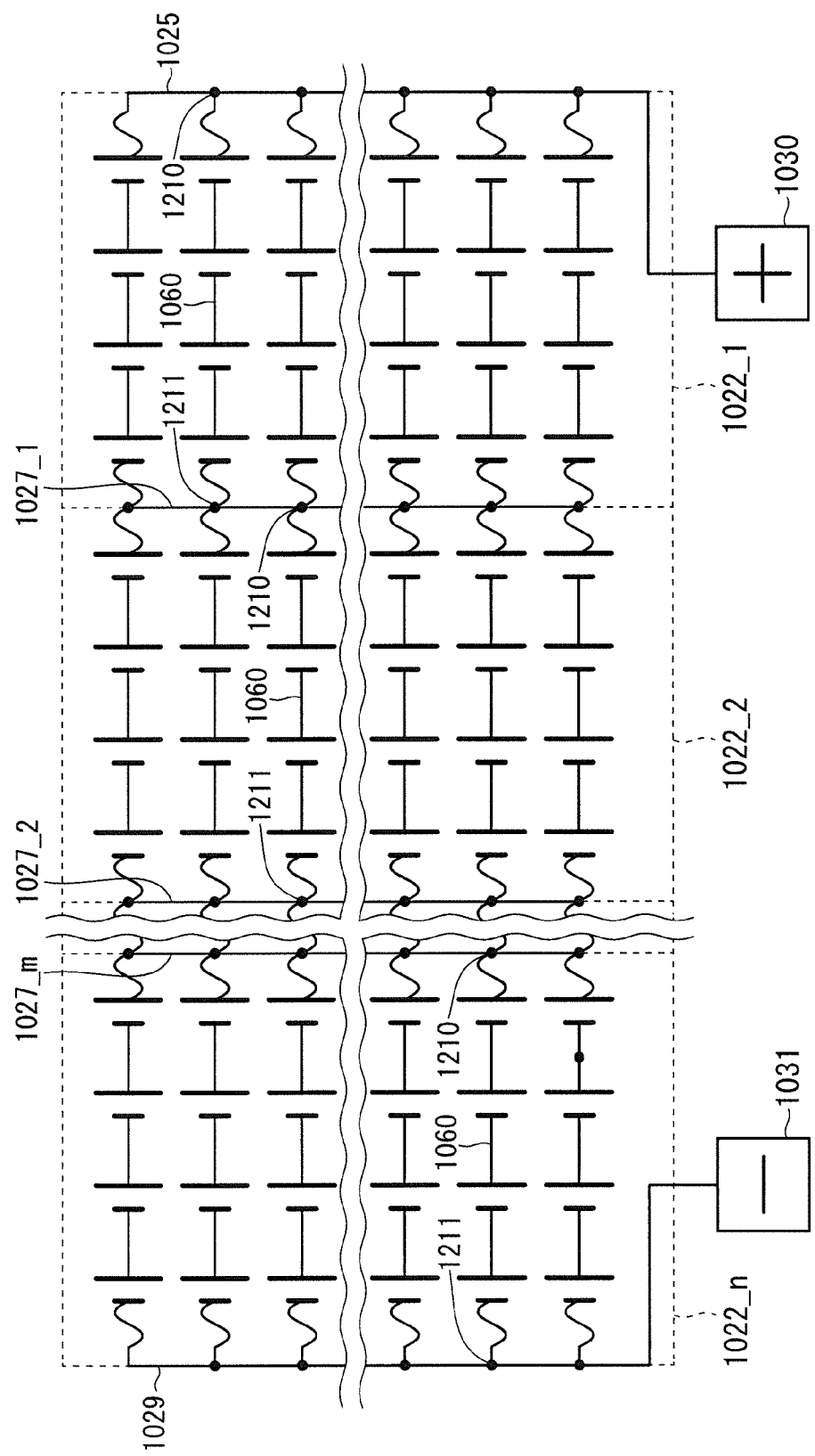
FIG. 11 is a circuit diagram of the module battery according to the first embodiment.

A schematic diagram of FIG. 11 is a circuit diagram of the module battery.

As shown in FIGS. 2 to 6 and in FIG. 11, a positive electrode end 1210 of each of the p strings 1060 belonging to the first string group 1022_1 on the most positive electrode side is electrically connected to the positive electrode bus 1025. A negative electrode end 1211 of each of the p strings 1060 belonging to the first string group 1022_1 is electrically connected to the first parallel bus 1027_1. The p strings 1060 belonging to the first string group 1022_1 are connected in parallel by the positive electrode bus 1025 and the first parallel bus 1027_1, so that a first block is formed. When current flows in the first block, the current is divided to flow through the p strings 1060 belonging to the first string group 1022_1.

The positive electrode end 1210 of each of the p strings 1060 belonging to an i-th string group 1022_i is electrically connected to an (i−1)th parallel bus 1027_i−1 where i is an integer in the range of 2 to n−1. The negative electrode end 1211 of each of the p strings 1060 belonging to the i-th string group 1022_i is electrically connected to an i-th parallel bus 1027_i. The p strings 1060 belonging to the i-th string group 1022_i are connected in parallel by the (i−1)th parallel bus 1027_i−1 and the i-th parallel bus 1027_i, so that an i-th block is formed. When current flows in the i-th block, the current is divided to flow through the p strings 1060 belonging to the i-th string group 1022_i.

The positive electrode end 1210 of each of the p strings 1060 belonging to the n-th string group 1022_n on the most negative electrode side is electrically connected to the m-th parallel bus 1027_m. The negative electrode end 1211 of each of the p strings 1060 belonging to the n-th string group 1022_n is electrically connected to the negative electrode bus 1029. The p strings 1060 belonging to the n-th string group 1022_n are connected in parallel by the m-th parallel bus 1027_m and the negative electrode bus 1029, so that an n-th block is formed. When current flows in the n-th block, the current is divided to flow through the p strings 1060 belonging to the n-th string group 1022_n.

(Structure of Cell)

Figure 12:
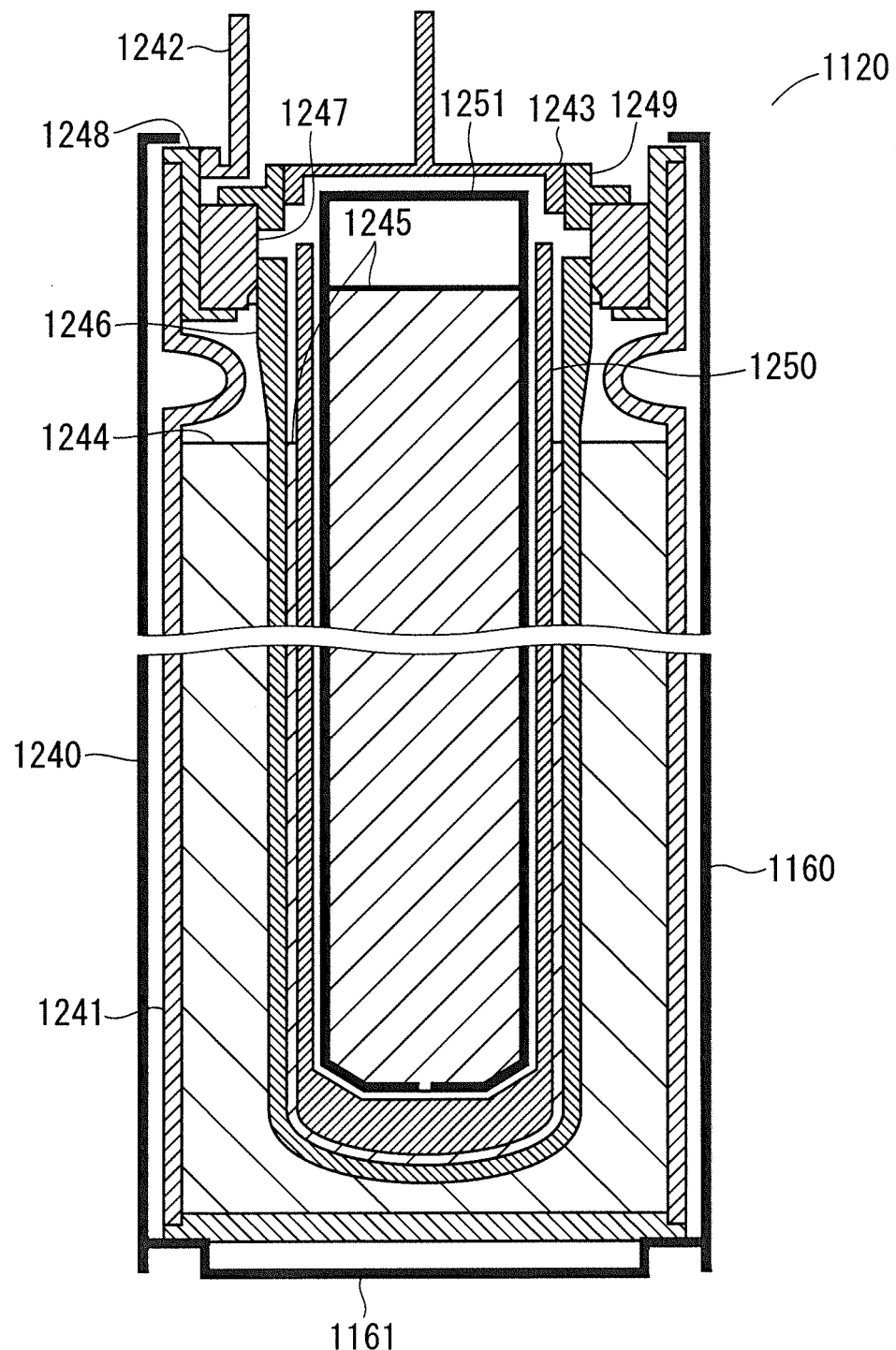
FIG. 12 is a sectional view a cylindrical cell according to the first embodiment.

A schematic view of FIG. 12 is a sectional view of a cylindrical cell.

As shown in FIG. 12, the cylindrical cell 1120 includes a sheath tube 1240, a positive electrode container 1241, a positive electrode terminal 1242, a negative electrode lid 1243, a positive electrode active material 1244, a negative electrode active material 1245, a solid electrolyte tube 1246, an electrical insulation ring 1247, a positive electrode metal fitting 1248, a negative electrode metal fitting 1249, a safety tube 1250 and a housing container 1251. The negative electrode lid 1243 functions also as a negative electrode terminal. A component in addition to these components may be added to the cylindrical cell 1120. All or part of the positive electrode metal fitting 1248, the negative electrode metal fitting 1249, the safety tube 1250 and the housing container 1251 are omitted depending on the structure of the cylindrical cell 1120.

The sheath tube 1240 is a tubular element. Preferably, the sheath tube 1240 is made of stainless steel.

The solid electrolyte tube 1246 is a tubular element made of an solid electrolyte. The solid electrolyte is a sodium ion conductor. Preferably, the solid electrolyte is a ceramics sintered body of β-alumina.

The electrical insulation ring 1247 is a ring-shaped element made of an electrical insulator. Preferably, the electrical insulator is a ceramics sintered body of α-alumina.

The electrical insulation ring 1247 is glass-bonded to the vicinity of an open end of the solid electrolyte tube 1246.

The positive electrode container 1241 is a tubular element. The positive electrode container 1241 and the negative electrode lid 1243 are made of an electric conductor. Preferably, the electric conductor is aluminum.

The negative electrode active material 1245 is housed in the housing container 1251. The housing container 1251 is housed in the safety tube 1250. The safety tube 1250 is housed in the solid electrolyte tube 1246. The solid electrolyte tube 1246 is housed in the positive electrode container 1241. The positive electrode container 1241 is housed in the sheath tube 1240. An open end of the safety tube 1250, an open end of the solid electrolyte tube 1246, an open end of the positive electrode container 1241 and an open end of the sheath tube 1240 are on the same side. Flames spurt out from the side on which the open end of the safety tube 1250, the open end of the solid electrolyte tube 1246, the open end of the positive electrode container 1241 and the open end of the sheath tube 1240 are present. The side on which the open end of the safety tube 1250, the open end of the solid electrolyte tube 1246, the open end of the positive electrode container 1241 and the open end of the sheath tube 1240 are present is the same side as the positive electrode terminal 1242 and the negative electrode lid 1243, and is the opposite side from the bottom surface 1161 of the cylindrical cell 1120. This is one of the reasons why the heat insulation material 1121 and the heat-resistant material 1122 need not necessarily coat the bottom surface 1161 of the cylindrical cell 1120.

The electrical insulation ring 1247 is coupled through the positive electrode metal fitting 1248 to the positive electrode container 1241, and is coupled through the negative electrode metal fitting 1249 to the negative electrode lid 1243. Both or one of the positive electrode metal fitting 1248 and the negative electrode metal fitting 1249 may be replaced with a structure which is not included in the category of metal fittings. The positive electrode metal fitting 1248 may be dispensed with, so that the electrical insulation ring 1247 is directly coupled to the positive electrode container 1241. The negative electrode metal fitting 1249 may be dispensed with, so that the electrical insulation ring 1247 is directly coupled to the negative electrode lid 1243.

The positive electrode terminal 1242 is coupled to the positive electrode metal fitting 1248.

The positive electrode active material 1244 is housed in a gap between the positive electrode container 1241 and the solid electrolyte tube 1246. The negative electrode active material 1245 is supplied from the housing container 1251 to a gap between the safety tube 1250 and the solid electrolyte tube 1246. The solid electrolyte tube 1246 contacts the positive electrode active material 1244 and the negative electrode active material 1245 to isolate the positive electrode active material 1244 and the negative electrode active material 1245 from each other. Thus, an electrochemical reaction occurs in the positive electrode active material 1244 and the negative electrode active material 1245 to generate an electromotive force.

The positive electrode active material 1244 includes sodium sulfide, and the negative electrode active material 1245 includes sodium.

Figure 13:
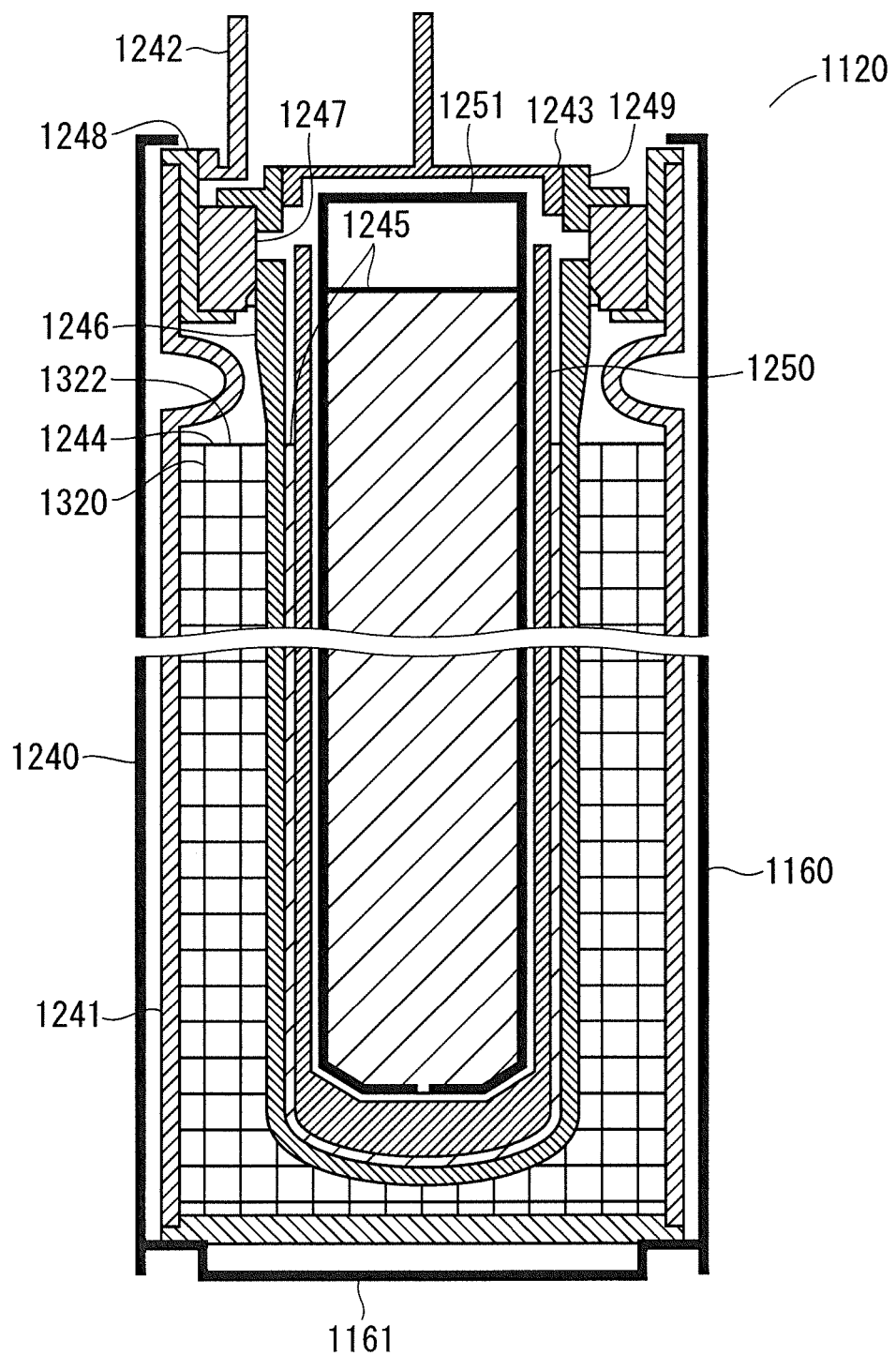
FIG. 13 is a sectional view the cylindrical cell according to the first embodiment.

As shown in FIG. 13, graphite felt 1320 is preferably housed in the gap between the positive electrode container 1241 and the solid electrolyte tube 1246, so that the positive electrode active material 1244 is impregnated into the graphite felt 1320. The graphite felt 1320 may be replaced with other types of electric conduction assistant materials. The electric conduction assistant material has a network structure into which the positive electrode active material 1244 can be impregnated, and contacts the positive electrode container 1241 and the positive electrode active material 1244 to perform the function of conducting electrons between the positive electrode container 1241 and the positive electrode active material 1244.

The heat-resistant material 1122 coats at least an area above an upper end 1322 of the graphite felt 1320.

The melting point of the graphite felt 1320 is approximately 3000° C. The melting points of the positive electrode container 1241, the positive electrode metal fitting 1248, the negative electrode metal fitting 1249 and the negative electrode lid 1243 are approximately 660° C. when the positive electrode container 1241, the positive electrode metal fitting 1248, the negative electrode metal fitting 1249 and the negative electrode lid 1243 are made of aluminum. The melting points of the positive electrode container 1241, the positive electrode metal fitting 1248, the negative electrode metal fitting 1249 and the negative electrode lid 1243 are much lower than the melting point of the graphite felt 1320. The same holds true when the positive electrode container 1241, the positive electrode metal fitting 1248, the negative electrode metal fitting 1249 and the negative electrode lid 1243 are made of a material other than aluminum.

When the cylindrical cell 1120 is burned, sodium and sulfur react inside the cylindrical cell 1120 to generate a high-temperature melt, so that a high pressure is developed inside the cylindrical cell 1120. Thus, when the cylindrical cell 1120 is burned, a component having a low melting point is damaged due to melting. As a result, a through hole is formed in the low-melting-point component, so that the pressure is released through the through hole.

However, when the heat-resistant material 1122 coats at least the area above the upper end 1322 of the graphite felt 1320, the heat-resistant material 1122 is disposed near the portion where the pressure is released to effectively prevent flames or melts from diffusing radially outwardly from the burned cylindrical cell 1120.

(Properties of Buses) Buses including the positive electrode bus 1025, the m parallel buses 1027_1 1027_2, . . . , 1027_m, the negative electrode bus 1029, the positive electrode bus bar 1030, the negative electrode bus bar 1031 and the like are interconnect structures having a low electrical resistance, a high mechanical strength and a high heat-resisting property, and typically have a plate-like shape or a rod-like shape. However, all or some of the buses may be replaced with other types of interconnect structures. For example, all or some of the buses may be replaced with cables.

The buses are preferably made of metal or an alloy, and more preferably made of an aluminum alloy.

The coupling of the components for electrical connection is performed by a method resistant to a high temperature at which the sodium sulfur batteries operate, such as welding, crimping and screwing.

(Example of Use of Module Battery)

Figure 14:
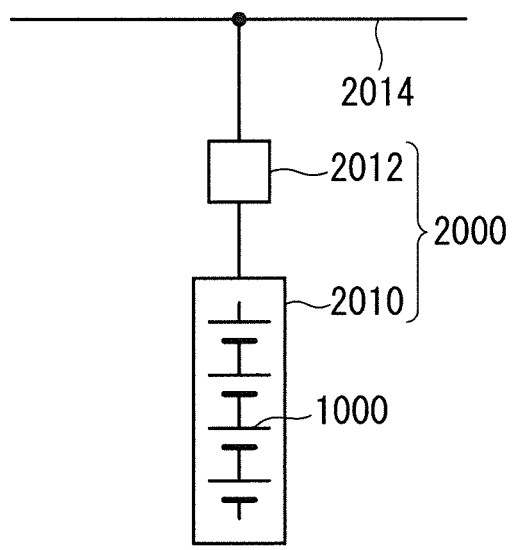
FIG. 14 is a schematic diagram of an example of the use of the module battery according to the first embodiment.

A schematic diagram of FIG. 14 shows an example of the use of the module battery 1000.

As shown in FIG. 14, the module battery 1000 is typically used for an electric power storage device 2000. When the module battery 1000 is used for the electric power storage device 2000, not less than two module batteries 1000 are connected in series, and a series connection element 2010 comprised of the not less than two module batteries 1000 is connected through an AC-DC converting device (PCS) 2012 and the like to an electric power system 2014. The module battery 1000 may be used for other purposes.

Second Embodiment

A second embodiment relates to a coated cell which is substituted for the coated cell of the first embodiment.

Figure 15:
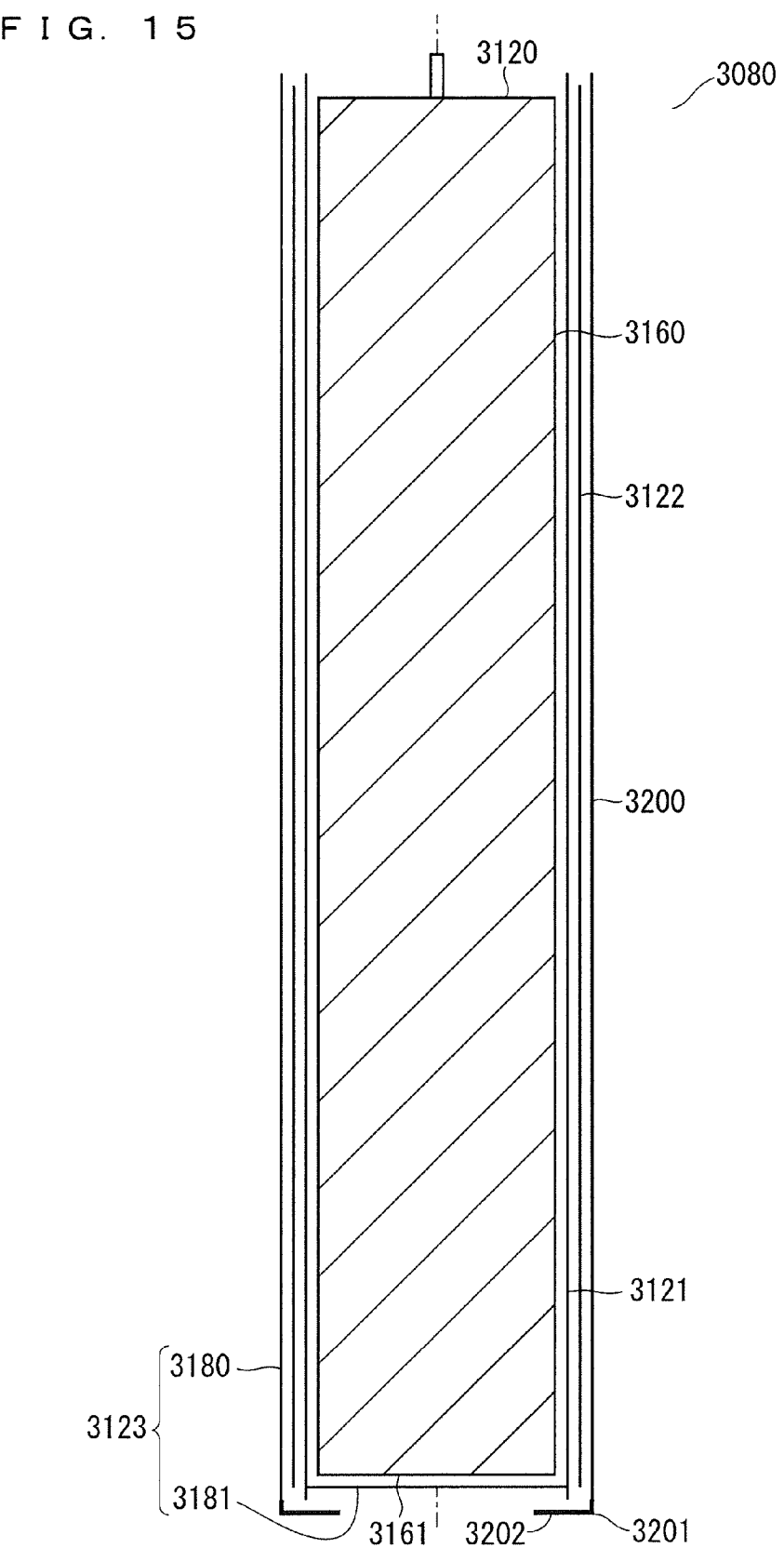
FIG. 15 is a vertical sectional view of the coated cell according to a second embodiment.

A schematic view of FIG. 15 is a vertical sectional view of a coated cell according to the second embodiment.

As shown in FIG. 15, a coated cell 3080 includes a cylindrical cell 3120, a heat insulation material 3121, a heat-resistant material 3122, and an electrical insulation material 3123. The electrical insulation material 3123 includes a first portion 3180 and a second portion 3181. The cylindrical cell 3120, the heat insulation material 3121 and the heat-resistant material 3122 are identical with the cylindrical cell 1120, the heat insulation material 1121 and the heat-resistant material 1122, respectively, of the first embodiment. The first portion 3180 of the electrical insulation material 3123 differs from the first portion 1180 of the electrical insulation material 1123 of the first embodiment in including a bent portion 3201 and a bottom surface-facing portion 3202 both to be described later. The second portion 3181 of the electrical insulation material 3123 is identical with the second portion 1181 of the electrical insulation material 1123 of the first embodiment.

The first portion 3180 of the electrical insulation material 3123 includes an outer peripheral surface-facing portion 3200, the bent portion 3201 and the bottom surface-facing portion 3202.

The first portion 3180 of the electrical insulation material 3123 is bent at the bent portion 3201. The bottom surface-facing portion 3202 is contiguous to the outer peripheral surface-facing portion 3200 via the bent portion 3201. The outer peripheral surface-facing portion 3200 is opposed to an outer peripheral surface 3160 of the cylindrical cell 3120, with the heat insulation material 3121 and the heat-resistant material 3122 therebetween. The bottom surface-facing portion 3202 is opposed to a bottom surface 3161 of the cylindrical cell 3120, with the second portion 3181 of the electrical insulation material 3123 therebetween, and supports the heat insulation material 3121, the heat-resistant material 3122 and the second portion 3181 of the electrical insulation material 3123 from below. This prevents the second portion 3181 of the electrical insulation material 3123 from falling.

When the first portion 3180 of the electrical insulation material 3123 is not a coating material that is radially outermost of the heat insulation material 3121, the heat-resistant material 3122 and the first portion 3180 of the electrical insulation material 3123, the radially outermost coating material includes an outer peripheral surface-facing portion, a bent portion and a bottom surface-facing portion. In this case, the outer peripheral surface-facing portion is opposed to the outer peripheral surface 3160 of the cylindrical cell 3120, with the coating materials other than the radially outermost coating material therebetween, and the bottom surface-facing portion is opposed to the bottom surface 3161 of the cylindrical cell 3120, with the second portion 3181 of the electrical insulation material 3123 therebetween, and supports the coating materials other than the radially outermost coating material and the second portion 3181 of the electrical insulation material 3123 from below.

While the present invention has been shown and described in detail, the foregoing description is in all aspects illustrative and not restrictive. It is therefore understood that numerous other modifications and variations can be devised without departing from the scope of the present invention.

REFERENCE SIGNS LIST

1000 Module battery
1020 Case
1080, 3080 Coated cells
1120, 3120 Cylindrical cells
1121, 3121 Heat insulation materials
1122, 3122 Heat-resistant materials
1123, 3123 Electrical insulation materials

The invention claimed is:
1. A coated cell comprising:
   a cylindrical cell of a sodium sulfur battery having an outer peripheral surface;
   a first coating material coating said outer peripheral surface;

a second coating material stacked radially outside said first coating material and
a third coating material stacked radially outside said second coating material,
wherein said first coating material, said second coating material and said third coating material are a heat insulation material, a heat-resistant material and an electrical insulation material respectively,
said first coating material, said second coating material and said third coating material are a heat insulation material, an electrical insulation material and a heat-resistant material respectively,
said first coating material, said second coating material and said third coating material are a heat-resistant material, a heat insulation material and an electrical insulation material respectively,
said first coating material, said second coating material and said third coating material are a heat-resistant material, an electrical insulation material and a heat insulation material respectively,
said first coating material, said second coating material and said third coating material are an electrical insulation material, a heat insulation material, and a heat-resistant material respectively, or
said first coating material, said second coating material and said third coating material are an electrical insulation material, a heat-resistant material and a heat insulation material respectively, and
wherein said heat insulation material is a flexible mica sheet having a thickness in the range of 0.6 mm to 1.8 mm, said heat-resistant material is made of carbon or ceramics, and said electrical insulation material is made of mica.

2. The coated cell according to claim 1, wherein said heat-resistant material is a carbon sheet laminate comprised of not less than two carbon sheets stacked one on top of another.

3. The coated cell according to claim 1, wherein said mica sheet has a thickness in the range of 1.0 mm to 1.4 mm.

4. The coated cell according to claim 1, wherein:
said cylindrical cell includes
a positive electrode container,
a solid electrolyte tube housed in said positive electrode container,
an electric conduction assistant material housed in a gap between said positive electrode container and said solid electrolyte tube,
a positive electrode active material housed in said gap and impregnated into said electric conduction assistant material, and
a negative electrode active material isolated from said positive electrode active material by said solid electrolyte tube;
said cylindrical cell has a bottom surface; and
said heat-resistant material coats at least an area above an upper end of said electric conduction assistant material.

5. The coated cell according to claim 4, wherein said electric conduction assistant material is graphite felt.

6. The coated cell according to claim 1, wherein said heat-resistant material is a carbon sheet laminate comprised of not less than two carbon sheets stacked one on top of another, and
each of said not less than two carbon sheets has a thickness in the range of 0.10 mm to 0.50 mm.

7. The coated cell according to claim 6, wherein each of said not less than two carbon sheets has a thickness in the range of 0.20 mm to 0.40 mm.

8. The coated cell according to claim 1, wherein said cylindrical cell has a bottom surface, and
an upper end of a coating material that is one of said heat insulation material and said electrical insulation material which is radially outside said heat-resistant material is above an upper end of said heat-resistant material.

9. The coated cell according to claim 8, wherein an upper end of a coating material that is one of said heat insulation material and said electrical insulation material which is radially inside said heat-resistant material is above the upper end of said heat-resistant material.

10. The coated cell according to claim 1, wherein said cylindrical cell has a bottom surface, and
said electrical insulation material is a first electrical insulation material,
said coated cell further comprising
a second electrical insulation material coating said bottom surface,
wherein said third coating material includes
an outer peripheral surface-facing portion opposed to said outer peripheral surface, with said first coating material and said second coating material therebetween,
a bent portion, and
a bottom surface-facing portion contiguous to said outer peripheral surface-facing portion via said bent portion, said bottom surface-facing portion being opposed to said bottom surface, with said second electrical insulation material therebetween, said bottom surface-facing portion supporting said first coating material, said second coating material and said second electrical insulation material.

11. A module battery comprising:
a case having a housing space formed therein; and
not less than two coated cells housed in said housing space,
each of said not less than two coated cells comprising:
a cylindrical cell of a sodium sulfur battery having an outer peripheral surface;
a first coating material coating said outer peripheral surface;
a second coating material stacked radially outside said first coating material; and
a third coating material stacked radially outside said second coating material,
wherein said first coating material, said second coating material and said third coating material are a heat insulation material, a heat-resistant material and an electrical insulation material respectively,
said first coating material, said second coating material and said third coating material are a heat insulation material, an electrical insulation material and a heat resistant material respectively,
said first coating material, said second coating material and said third coating material are a heat-resistant material, a heat insulation material and an electrical insulation material respectively,
said first coating material, said second coating material and said third coating material are a heat-resistant material, an electrical insulation material and a heat insulation material respectively,
said first coating material, said second coating material and said third coating material are an electrical insulation material, a heat insulation material, and a heat-resistant material respectively, or
said first coating material, said second coating material and said third coating material are an electrical insulation material, a heat-resistant material and a heat insulation material respectively, and wherein said heat insulation material is a flexible mica sheet having a thickness in the range of 0.6 mm to 1.8 mm, said heat-resistant material is made of carbon or ceramics, and said electrical insulation material is made of mica.

12. The module battery according to claim 11, wherein said not less than two coated cells are erected vertically and squarely arranged in a horizontal direction.

* * * * *